United States Patent
Chen et al.

(10) Patent No.: US 8,358,118 B2
(45) Date of Patent: *Jan. 22, 2013

(54) CURRENT MODE BOOST CONVERTER WITH FIXED PWM/PFM BOUNDARY

(75) Inventors: Chih-Ning Chen, Taipei (TW); Kang Sheng, Taoyuan County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 247 days.

This patent is subject to a terminal disclaimer.

(21) Appl. No.: 12/975,384

(22) Filed: Dec. 22, 2010

(65) Prior Publication Data

US 2012/0049825 A1    Mar. 1, 2012

(30) Foreign Application Priority Data

Aug. 31, 2010 (TW) ............................... 99129319 A (51) Int. Cl.
  G05F 1/613 (2006.01)
  G05F 1/575 (2006.01)
(52) U.S. Cl. ....................................... 323/285; 323/222
(58) Field of Classification Search ................... 323/222, 323/223, 282, 284, 285, 351
  See application file for complete search history.

(56) References Cited

U.S. PATENT DOCUMENTS

| | | | |
|---|---|---|---|
| 4,837,495 A | 6/1989 | Zansky | |
| 6,366,070 B1 | 4/2002 | Cooke | |
| 6,828,766 B2 | 12/2004 | Corva | |
| 7,425,819 B2 * | 9/2008 | Isobe | 323/222 |
| 8,106,642 B2 * | 1/2012 | Chen et al. | 323/284 |
| 2008/0218142 A1 | 9/2008 | Uehara | |
| 2009/0273325 A1 | 11/2009 | Nakahashi | |
| 2009/0302820 A1 | 12/2009 | Shimizu | |
| 2010/0066328 A1 | 3/2010 | Shimizu | |
| 2010/0308783 A1 | 12/2010 | Farley | |
| 2011/0062929 A1 | 3/2011 | Strydom | |
| 2011/0089918 A1 | 4/2011 | Chang | |
| 2011/0115770 A1 | 5/2011 | Seo | |

* cited by examiner

*Primary Examiner* — Gary L Laxton
(74) *Attorney, Agent, or Firm* — Winston Hsu; Scott Margo (57) ABSTRACT

A current mode Boost converter is disclosed. The Boost converter operates in a pulse width modulation (PWM) mode or a pulse frequency modulation (PFM) mode. To prevent a load current with various probable magnitudes from varying a decision boundary between the PWM mode and the PFM mode, the Boost converter adaptively adjusts a trigger condition for the PFM mode according to a mean value of an inductor current or AC components of an inductor current of an inductor and a slope compensation current.

14 Claims, 7 Drawing Sheets

CURRENT MODE BOOST CONVERTER WITH FIXED PWM/PFM BOUNDARY

BACKGROUND OF THE INVENTION

1. Field of the Invention

The present invention is related to a current mode boost converter, and more particularly, to a current mode boost converter that adaptively adjusts an activation condition of a pulse frequency modulation mode according to a mean value of an inductor current or AC components of a slope compensation current and the inductor current.

2. Description of the Prior Art

An electronic device generally includes various components requiring different operating voltages. Therefore, a DC-DC voltage converter is essential for the electronic device to adjust (step up or step down) and stabilize voltage levels. Based upon different power requirements, various types of DC-DC voltage converter, originating from a buck (step down) converter and a boost (step up) converter, are developed. Accordingly, the buck converter can decrease an input DC voltage to a default voltage level, and the boost converter can increase an input DC voltage. With advances in circuit technology, both the buck and boost converters are varied and modified to conform to different system architectures and requirements.

Figure 1:
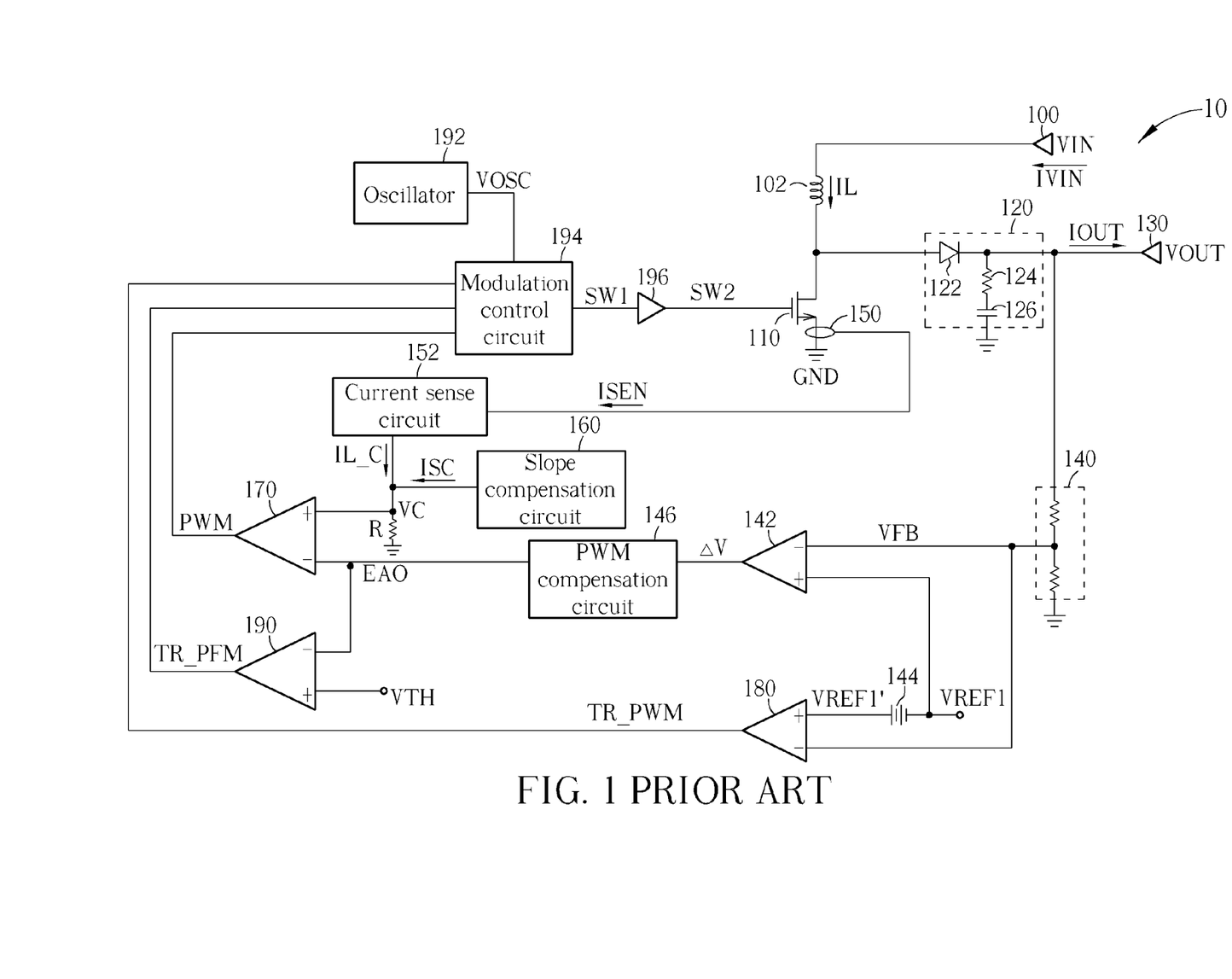
FIG. 1 is a schematic diagram of a boost converter of the prior art.

For example, please refer to FIG. 1, which is a schematic diagram of a boost converter 10 of the prior art. The boost converter 10 includes an input end 100, an inductor 102, a switch transistor 110, an output module 120, an output end 130, a feedback module 140, an error amplifier 142, a voltage reduction circuit 144, a pulse width modulation (PWM) compensation circuit 146, a current sensor 150, a current sense circuit 152, a slope compensation circuit 160, a first comparator 170, a second comparator 180, a third comparator 190, an oscillator 192 and a modulation control circuit 194. The input end 100 is utilized for receiving an input voltage VIN. The switch transistor 110 is utilized for determining whether an inductor current IL of the inductor 102 charges the output module 120 according to a second switch signal SW2. The output module 120 includes a diode 122, an output resistor 124 and an output capacitor 126, and is utilized for generating an output voltage VOUT based on the inductor current IL, a conduction state of the switch transistor 110 and frequency responses of the diode 122, the output resistor 124 and the output capacitor 126. The feedback module 140 is utilized for generating a division voltage of the output voltage VOUT as a feedback signal VFB. The error amplifier 142 is utilized for amplifying a difference between the feedback signal VFB and a first reference voltage VREF1 to generate a difference voltage ΔV. The voltage reduction circuit 144 is utilized for generating a division voltage VREF1' at a level slightly lower than the first reference voltage VREF1. The second comparator 180 is utilized for comparing the division voltage VREF1' and the feedback signal VFB to generate a PWM trigger signal TR_PWM. Other than the feedback scheme, the current sensor 150 generates a sensing current ISEN proportional to the inductor current IL. The current sense circuit 152 amplifies the sensing current ISEN to reconstruct the inductor current IL as a mirror inductor current IL_C. The slope compensation circuit 160 is utilized for generating a slope compensation current ISC. A summation of the mirror inductor current IL_C and the slope compensation current ISC is converted into a compensation voltage VC through a resistor R. The PWM compensation circuit 146 is utilized for compensating a frequency response of the boost converter 10 based on the difference voltage ΔV to generate a compensation result EAO. The first comparator 170 is utilized for comparing the compensation voltage VC and the compensation result EAO to generate a PWM signal VPWM. The second comparator 180 is utilized for comparing the feedback signal VFB and a division voltage VREF1 at a level slightly lower than the first reference voltage VREF1 to generate a PWM trigger signal TR_PWM. The third comparator 190 is utilized for comparing the compensation result EAO and a constant threshold voltage VTH to generate a pulse frequency modulation (PFM) trigger signal TR_PFM. The oscillator 192 is utilized for generating an oscillating signal VOSC. Finally, the modulation control circuit 194 determines an operation mode of the boost converter 10 based on the PWM trigger signal TR_PWM, the PFM trigger signal TR_PFM, the PWM signal VPWM and the oscillating signal VOSC, and accordingly generates a first switch signal SW1 sent to an amplifier 196. The amplifier 196 amplifies the first switch signal SW1 to generate a second switch signal SW2 sent to the switch transistor 110.

In short, the boost converter 10 determines whether to operate in a PWM mode or a PFM mode based on the inductor current IL. When the inductor current IL is relatively low, the boost converter 10 switches from the PWM mode to the PFM mode to reduce a switching loss of the boost converter 10 by minimizing switching operations of the switch transistor 110. The boost converter 10 generates the PWM trigger signal TR_PWM and the PFM trigger signal TR_PFM according to the sensing current ISEN and the feedback signal VFB, and accordingly determines whether to operate in the PWM mode or the PFM mode.

Figure 2:
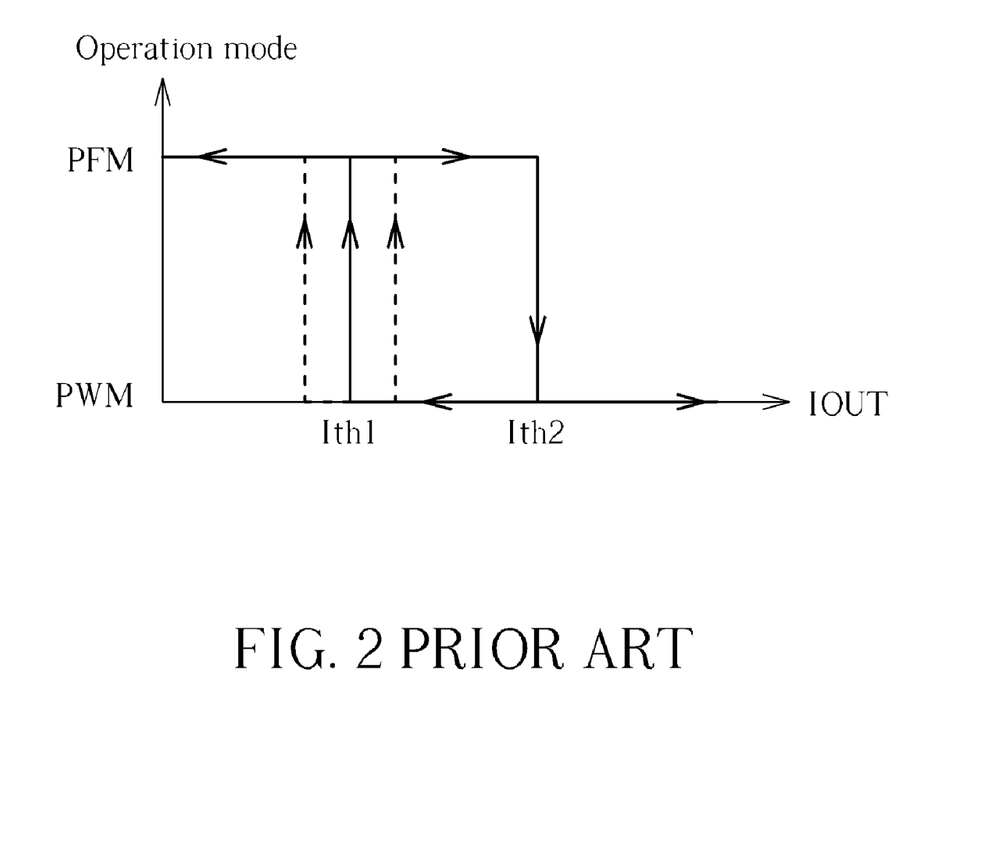
FIG. 2 is a schematic diagram of current thresholds of the boost converter shown in FIG. 1.

For example, under a condition that the input voltage VIN and the output voltage VOUT are invariant, the larger the inductor 102, the higher a current threshold Ith1 specifying a decision boundary from the PWM mode to the PFM mode, as illustrated in FIG. 2. In the worst case, the current threshold Ith1 is even higher than a current threshold Ith2 specifying a decision boundary from the PFM mode to the PWM mode, causing the boost converter 10 to oscillate between the PWM mode and the PFM mode and malfunction. To prevent the mode oscillation, one approach is to decrease the threshold voltage VTH. However, the lower threshold voltage results in a very small current threshold Ith1 when inductance of the inductor 102 is relatively small, implying that the PFM mode is inaccessible.

Therefore, fixing the decision boundaries between the PWM mode and the PFM mode has been a major focus of the industry.

SUMMARY OF THE INVENTION

It is therefore a primary objective of the claimed invention to provide a current mode boost converter.

The present invention discloses a current mode boost converter comprising an input end for receiving an input voltage, an output end for outputting an output voltage, an inductor comprising a first end coupled to the input end, and a second end, a feedback module coupled to the output end for generating a feedback signal according to the output voltage, a switch transistor comprising a source end, a drain end coupled to the second end of the inductor, and a gate end for determining whether the inductor is electrically connected to a ground end according to a second switch signal, an output module comprising a diode coupled between the drain end of the switch transistor and the output end, an output resistor coupled to the output end, and an output capacitor coupled between the output resistor and the ground end, a current sensor coupled between the source end of the switch transistor and the ground end for sensing an inductor current of the inductor to generate a sensing current, a current sense circuit coupled to the current sensor for amplifying the sensing current to duplicate the inductor current as a first mirror inductor current and a second mirror inductor current, a slope compensation circuit for generating a first slope compensation current and a second slope compensation current, a first resistor for converting a summation of the first mirror inductor current and the first slope compensation current into a compensation voltage, an error amplifier coupled to the feedback module for amplifying a difference between the feedback signal and a first reference signal to generate a difference voltage, a pulse width modulation (PWM) compensation circuit coupled to the error amplifier for compensating a frequency response of the boost converter according to the difference voltage to generate a compensation result, a first comparator coupled to the current sense circuit, the slope compensation circuit, the resistor and the PWM compensation circuit for comparing the compensation voltage and the compensation result to generate a PWM signal, a second comparator coupled to the feedback module for comparing the feedback signal and a division voltage of the first reference voltage to generate a PWM trigger signal, a third comparator for comparing a second reference voltage and a threshold voltage to generate a pulse frequency modulation (PFM) trigger signal, an oscillator, for generating an oscillating signal, and a modulation control circuit coupled to the first comparator, the second comparator, the third comparator and the oscillator for generating a first switch signal according to the PWM trigger signal, the PFM trigger signal, the PWM signal and the oscillating signal.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
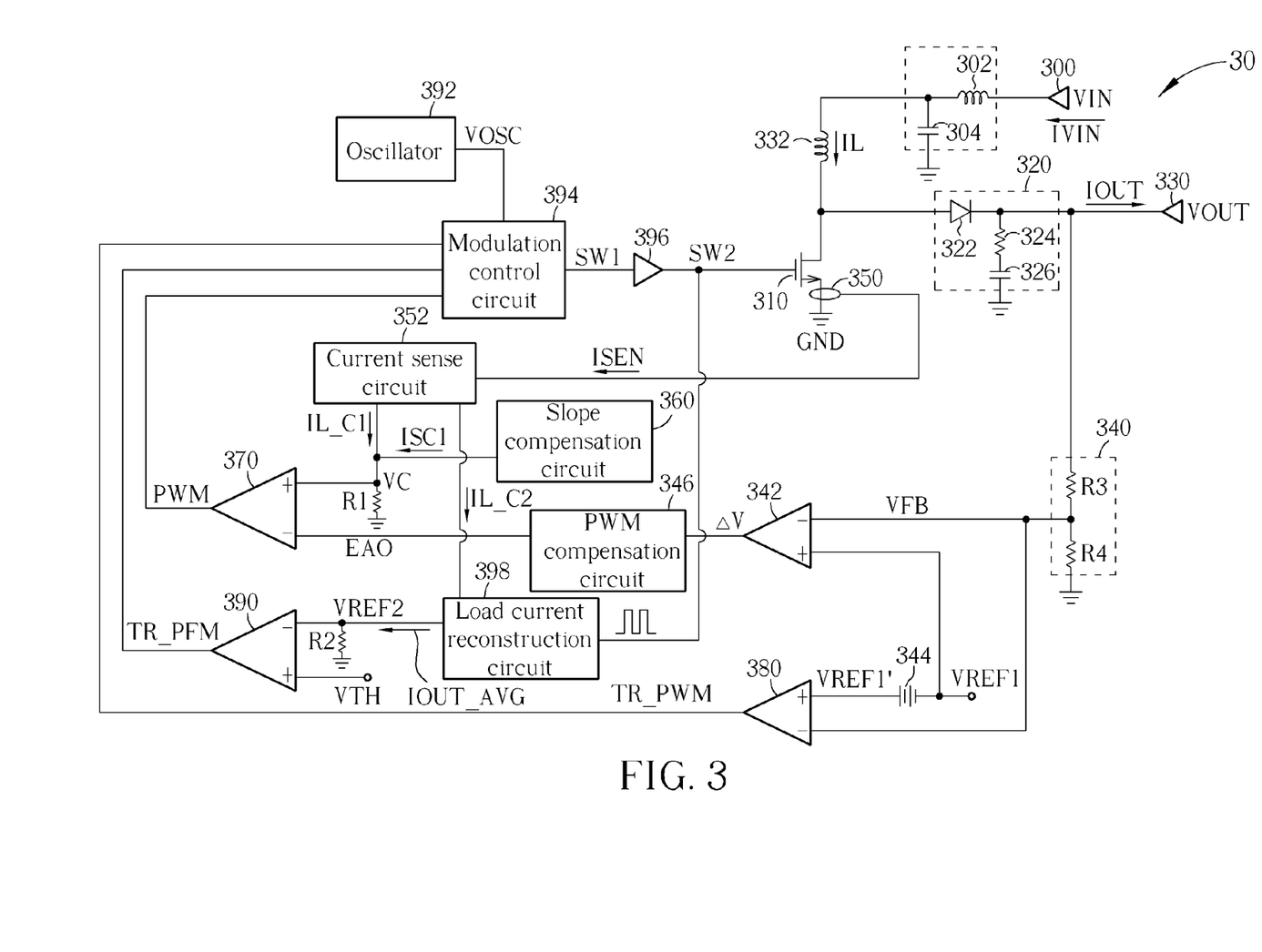
FIG. 3 is a schematic diagram of a boost converter according to an embodiment of the present invention.

Please refer to FIG. 3, which is a schematic diagram of a current mode boost converter 30 according to an embodiment of the present invention. The boost converter 30 includes an input end 300, an output end 330, an inductor 332, a feedback module 340, a switch transistor 310, an output module 320, a current sensor 350, a current sense circuit 352, a slope compensation circuit 360, a first resistor R1, a second resistor R2, an error amplifier 342, a pulse width modulation (PWM) compensation circuit 346, a first comparator 370, a second comparator 380, a third comparator 390, an oscillator 392, a modulation control circuit 394, an input inductor 302, an input capacitor 304, a voltage reduction circuit 344 and a load current reconstruction circuit 398. The input end 300 is utilized for receiving an input voltage VIN. The input inductor 302 and the input capacitor 304 are utilized for performing low-pass filtering on the input voltage VIN. The inductor 332 is utilized for modulating energy to enable the output module 320 when the switch transistor 310 is disabled. The switch module 410 is utilized for determining whether an inductor current IL of the inductor 332 flows to the output module 320 or a ground end GND based on a second switch signal SW2. The output module 320 includes a diode 322, an output resistor 324 and an output capacitor 326. The diode 322 is forward biased when the switch transistor 310 is disabled to generate an output voltage VOUT based on frequency responses of the output resistor 324 and the output capacitor 326. The output end 330 is utilized for outputting the output voltage VOUT. The feedback module 340 is utilized for generating a feedback signal VFB according to the output voltage VOUT. The current sensor 350 is utilized for sensing the inductor current IL to generate a sensing current ISEN. The current sensing circuit 352 is utilized for amplifying the sensing current ISEN to reconstruct the inductor current IL as a first mirror inductor current IL_C1 and a second mirror inductor current IL_C2. The slope compensation circuit 360 is utilized for generating a first slope compensation current ISC1. The first resistor R1 is utilized for converting a sum of the first mirror inductor current IL_C1 and the first slope compensation current ISC1 into a compensation voltage VC. The error amplifier 342 is utilized for amplifying a difference between the feedback signal VFB and a first reference signal VREF1 to generate a differential voltage ΔV. The PWM compensation circuit 346 is utilized for compensating a frequency response of the boost converter 30 according to the differential voltage ΔV to generate a compensation result EAO. The first comparator 370 is utilized for comparing the compensation voltage VC and the compensation result EAO to generate a PWM signal VPWM. The voltage reduction circuit 344 is utilized for generating a division voltage VREF1' at a level slightly lower than the first reference voltage VREF1. The second comparator 380 is utilized for comparing the feedback signal VFB and the division voltage VREF1 to generate a PWM trigger signal TR_PWM. The load current reconstruction circuit 398 is utilized for averaging the second mirror inductor current IL_C2, and calculates a mean load current IOUT_AVG of the load current IOUT based on a duty cycle of the second switch signal SW2. The second resistor R2 is utilized for converting the mean load current IOUT_AVG into a second reference voltage VREF2. The third comparator 390 is utilized for comparing the second reference voltage VREF2 and a threshold voltage VTH to generate a pulse frequency modulation (PFM) trigger signal TR_PFM. The oscillator 392 is utilized for generating an oscillating signal VOSC. Finally, the modulation control circuit 394 generates a first switch signal SW1 sent to the switch transistor 310 according to the PWM trigger signal TR_PWM, the PFM trigger signal TR_PFM, the PWM signal VPWM and the oscillating signal VOSC.

Figure 4:
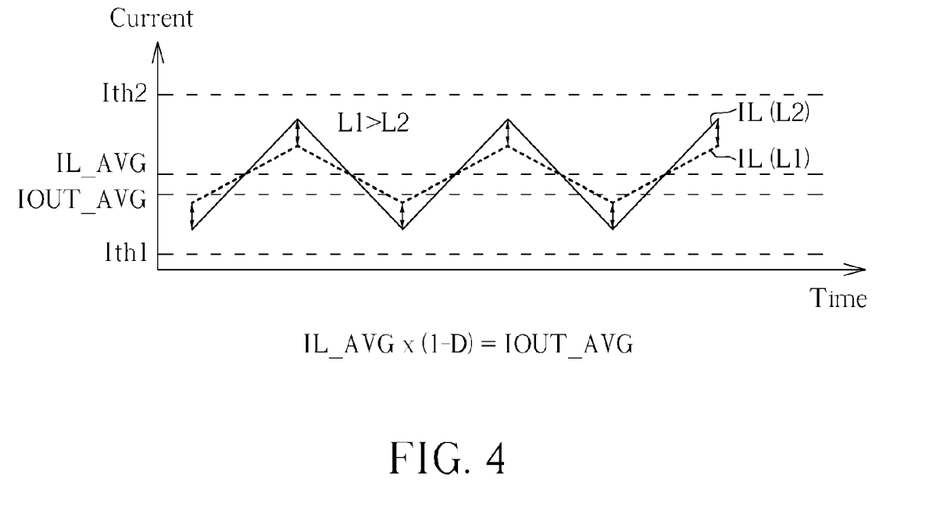
FIG. 4 is a time-variant schematic diagram of a load current of the boost converter shown in FIG. 3.

In short, to fix the problem of the current threshold Ith1 varying with the input voltage VIN, the output voltage VOUT and the inductance of the inductor 102 in the prior art, the boost converter 40 additionally includes the load current reconstruction circuit 398 to calculate the mean load current IOUT_AVG. As a result, even if the input voltage VIN, the output voltage VOUT and the inductance of the inductor 332 are variant due to different applications or manufacturing process errors, and peaks of the inductor current IL are variant accordingly, a trigger condition for the PFM mode (triggered by the third comparator 390) is still invariant since the mean load current IOUT_AVG is independent of the inductance of the inductor 322. That is, the current threshold Ith1 is constant in boost converter 30, as illustrated in FIG. 4.

Figure 5A:
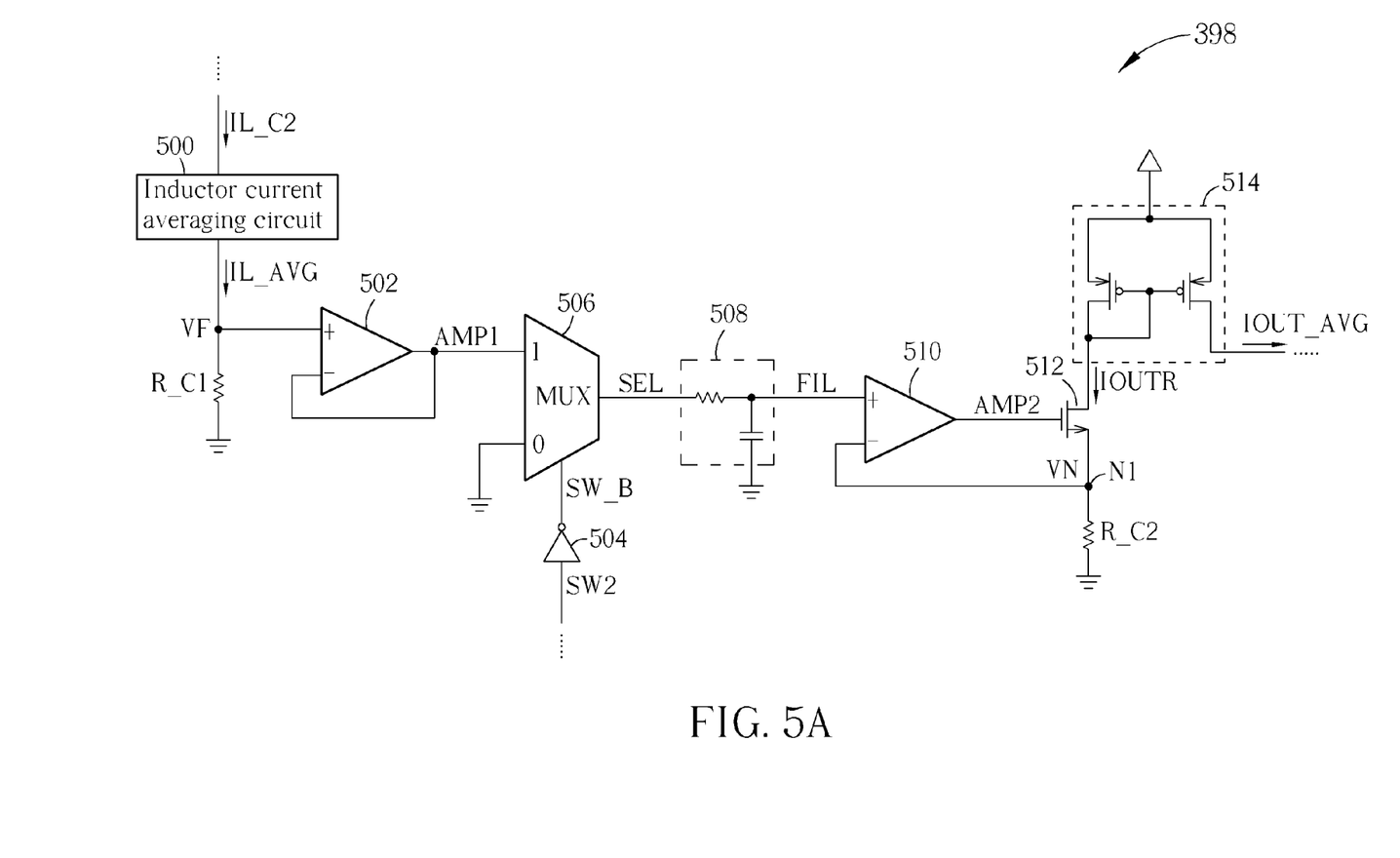
FIG. 5A is a schematic diagram of a load current reconstruction circuit of the boost converter shown in FIG. 3.
Figure 5B:
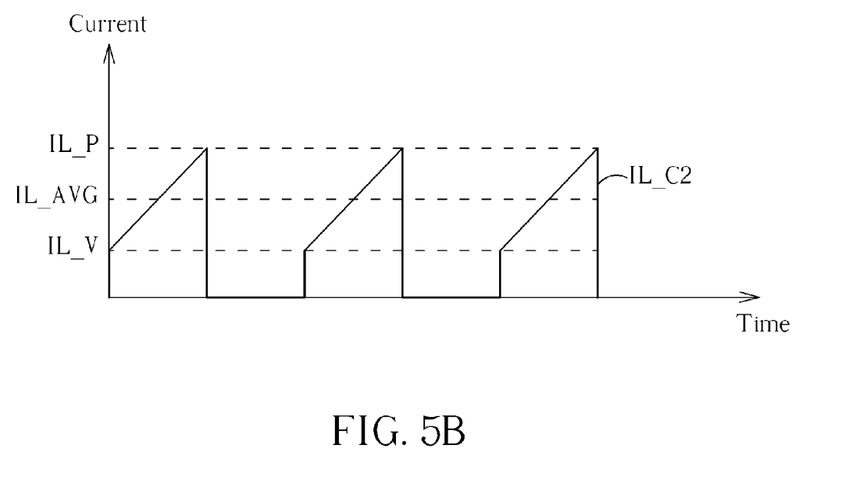
FIG. 5B is a time-variant schematic diagram of a second mirror inductor current of the boost converter shown in FIG. 3.

In detail, please refer to FIG. 5A, which is a schematic diagram of the load current reconstruction circuit 398. In FIG. 5A, the load current reconstruction circuit 398 includes an inductor current averaging circuit 500, a first conversion resistor R_C1, a first amplifier 502, an inverter 504, a multiplexer 506, a lowpass filter 508, a second conversion resistor R_C2, a second amplifier 510, a conversion transistor 512 and a current mirror 514. The inductor current averaging circuit 500 is utilized for averaging a top value IL_P and a bottom value IL_V of the second mirror inductor current IL_C2 to generate a mean current IL_AVG of the inductor current IL, as illustrated in FIG. 5B. The first conversion resistor R_1 is utilized for converting the mean current IL_AVG into a mean voltage VF. The first amplifier 502 is utilized for amplifying a difference between the mean voltage VF and a first amplification result AMP1 to stabilize the first amplification result AMP1. The inverter 504 is utilized for inverting the second switch signal SW2 to generate an inverted switch signal SW_B. The multiplexer 506 is utilized for selecting the first amplification result AMP1 or a ground voltage according to the inverted switch signal SW_B to generate a selection result SEL. The lowpass filter 508 is utilized for performing lowpass-filtering on the selection result SEL to generate a filtering result FIL. The second amplifier 510 is utilized for amplifying a difference between the filtering result FIL and a node voltage VN to generate a second amplification result AMP2. The conversion transistor 512 is utilized for determining whether to generate a reconstructed load current IOUTR according to the second amplification result AMP2. Finally, the current mirror 514 duplicates the reconstructed load current IOUTR to generate the mean load current IOUT_AVG.

Note that, in an ideal case, an input power and an output power of the boost converter 30 are equal, i.e.

$$VIN \times IVIN = VOUT \times IOUT \quad (Eq.\ 1)$$

where IVIN represents an input current at the input end 300. Eq. 1 can be further derived as:

$$IOUT = IVIN \times \frac{VIN}{VOUT} = IVIN \times (1-D) \quad (Eq.\ 2)$$

$$IOUT\_AVG = IL\_AVG \times (1-D) \quad (Eq.\ 3)$$

where D represents the duty cycle of the second switch signal SW2. In Eq. 3, the mean inductor current IL_AVG is directly proportional to the mean load current IOUT_AVG. Therefore, the load current reconstruction circuit 398 merely transmits the mean current IL_AVG for (1−D)*100% of time per cycle, which is then filtered and mirrored to generate the mean load current IOUT_AVG, so as to switch the operation modes of the boost converter 30 based on the load current IOUT.

Correspondingly, the threshold voltage VTH has to be a constant. As a result, regardless of the inductance of the inductor 332 employed in the boost converter 30, the current threshold Ith1 specifying a decision boundary from the PWM mode to the PFM mode is invariant. Certainly, in order to send information of the inductor current IL to the load current reconstruction circuit 398, the second mirror inductor current IL_C2 is preferably equal to the first mirror inductor current IL_C1.

Other than calculating the mean load current IOUT_AVG, the present invention discloses another approach which compensates for variations of the current threshold Ith1 caused by variations of the input voltage VIN, the output voltage VOUT and the inductance of the inductor 332 based on alternating current (AC) components of the inductor current IL and a second slope compensation current ISC2. Please refer to FIG. 6, which is a schematic diagram of a boost converter 60 according to an embodiment of the present invention. The boost converter 60 is similar to the boost converter 30, but further includes a threshold adjustment circuit 600 which replaces the load current reconstruction circuit 398 of the boost converter 30. The threshold adjustment circuit 600 is utilized for adaptively generating the threshold voltage VTH according to the second mirror inductor current IL_C2, the second slope compensation current ISC2 and the duty cycle of the second switch signal SW2. That is, the boost converter 60 counteracts variation information of current ripples of the load current IOUT and the slope compensation currents by feeding a "+" terminal of the third comparator 390 with variation information of the second mirror inductor current IL_C2 and the second slope compensation current ISC2 to fix the current threshold Ith1.

Figure 6:
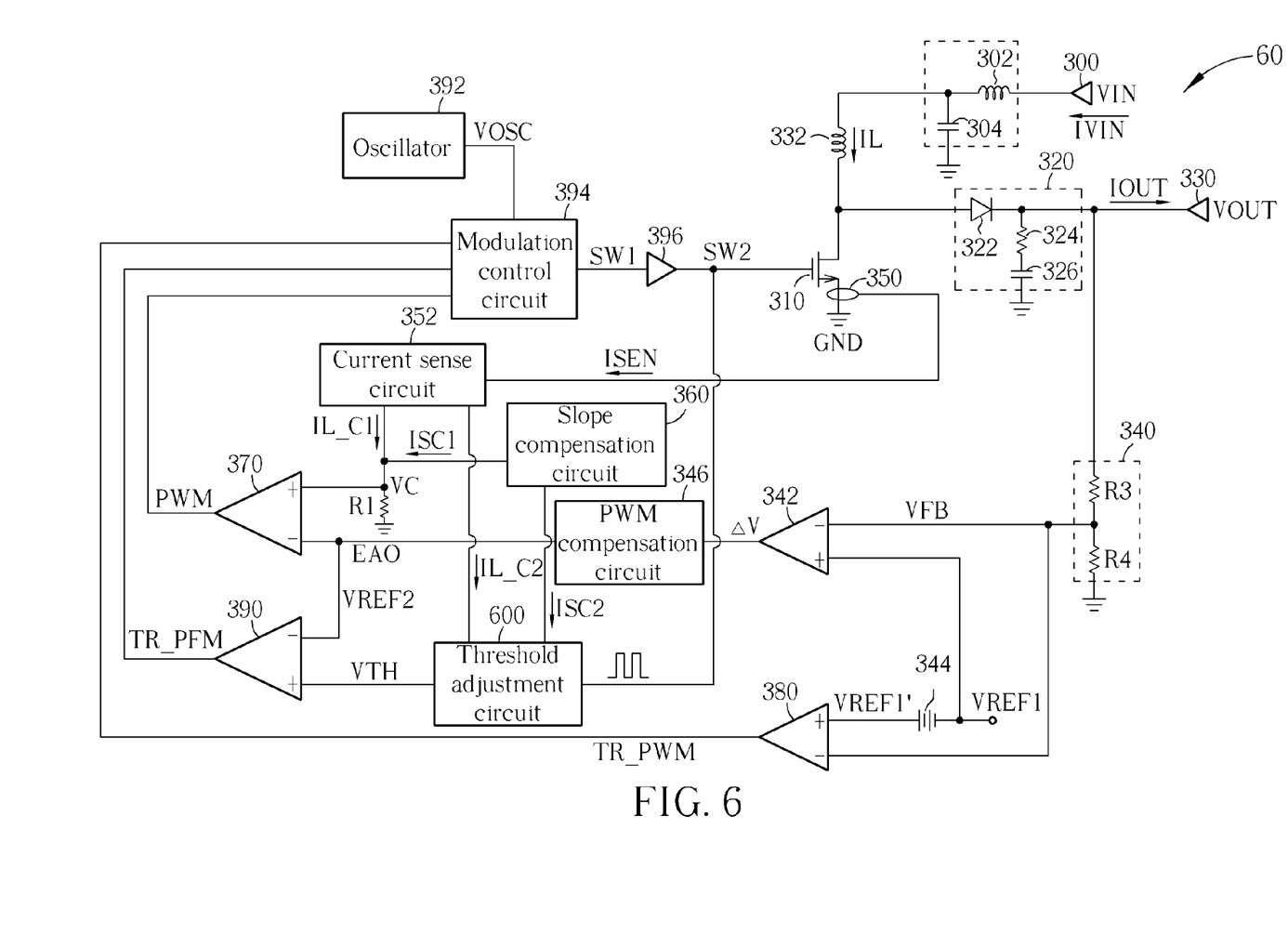
FIG. 6 is a schematic diagram of an alternative embodiment of the boost converter shown in FIG. 3.

Correspondingly, in the boost converter 60, the third comparator 390 is further coupled to the PWM compensation circuit 346 and the first comparator 370 to receive the compensation result EAO as the second reference voltage VREF2.

Therefore, in FIG. 6, the second mirror inductor current IL_C2 is equal to AC components of the first mirror inductor current IL_C1, and the second slope compensation current ISC2 is equal to AC components of the first slope compensation current ISC1.

With respect to feedback routes of the boost converters 30, 60, the feedback module 340 includes a third resistor R3 and a fourth resistor R4 for dividing the output voltage VOUT and generating the feedback signal VFB. In addition, the voltage reduction circuit 344 is preferably a direct current (DC) voltage source or a voltage division circuit for generating the division voltage VREF1' slightly lower than the first reference voltage VREF1.

Finally, the modulation control circuit 394 generates the second switch signal SW2 according to the PWM signal VPWM and the oscillating signal VOSC when the PWM trigger signal is enabled. Preferably, the switch transistor 310 is an N-type metal-oxide semiconductor (MOS) transistor. Therefore, the boost converters 30, 60 further include an amplifier 396 for amplifying the first switch signal SW1 to generate the second switch signal SW2, so as to enable the switch transistor 310 with a desired ratio.

In the prior art, the boost converter 10 determines whether to operate in the PWM mode or the PFM mode based on the load current IOUT. However, since the current threshold Ith1 specifying the decision boundary from the PWM mode to the PFM mode varies with the input voltage VIN, the output voltage VOUT and the inductance of the inductor 102, the load current IOUT may erroneously trigger mode switch. In the worst case, the boost converter 10 operationally oscillates between the PWM mode and the PWM mode and malfunctions. In comparison, the present invention compensates for variations of the current threshold Ith1 caused by the input voltage VIN, the output voltage VOUT and/or the inductance of the inductor 332 by calculating the mean load current IOUT_AVG or providing the AC components of the first mirror inductor current IL_C1 and the first compensation current ISC1, so as to fix the decision boundary from the PWM mode to the PFM mode.

To sum up, the present invention compensates for variations of the current threshold caused by the input voltage, the output voltage and/or the inductance of the inductor by calculating the mean load current or providing the AC components of the inductor current and the compensation current, so as to fix the decision boundary from the PWM mode to the PFM mode.

Those skilled in the art will readily observe that numerous modifications and alterations of the device and method may be made while retaining the teachings of the invention.

What is claimed is:

1. A current mode boost converter comprising:
an input end, for receiving an input voltage;
an output end, for outputting an output voltage;
a first inductor, comprising a first end coupled to the input end, and a second end;
a feedback module, coupled to the output end, for generating a feedback signal according to the output voltage;
a switch transistor, comprising a source end, a drain end coupled to the second end of the first inductor, and a gate end, for determining whether the first inductor is electrically connected to a ground end according to a second switch signal;
an output module, comprising:
a diode, coupled between the drain end of the switch transistor and the output end;
an output resistor, coupled to the output end; and
an output capacitor, coupled between the output resistor and the ground end;
a current sensor, coupled between the source end of the switch transistor and the ground end, for sensing an inductor current of the first inductor to generate a sensing current;
a current sense circuit, coupled to the current sensor, for amplifying the sensing current to duplicate the inductor current as a first mirror inductor current and a second mirror inductor current;
a slope compensation circuit, for generating a first slope compensation current and a second slope compensation current;
a first resistor, for converting a summation of the first mirror inductor current and the first slope compensation current into a compensation voltage;
an error amplifier, coupled to the feedback module, for amplifying a difference between the feedback signal and a first reference signal to generate a difference voltage;
a pulse width modulation (PWM) compensation circuit, coupled to the error amplifier, for compensating a frequency response of the boost converter according to the difference voltage to generate a compensation result;
a first comparator, coupled to the current sense circuit, the slope compensation circuit, the resistor and the PWM compensation circuit, for comparing the compensation voltage and the compensation result to generate a PWM signal;
a second comparator, coupled to the feedback module, for comparing the feedback signal and a division voltage of the first reference voltage to generate a PWM trigger signal;
a third comparator, for comparing a second reference voltage and a threshold voltage to generate a pulse frequency modulation (PFM) trigger signal;
an oscillator, for generating an oscillating signal; and
a modulation control circuit, coupled to the first comparator, the second comparator, the third comparator and the oscillator, for generating a first switch signal according to the PWM trigger signal, the PFM trigger signal, the PWM signal and the oscillating signal.

2. The boost converter of claim 1 further comprising a load current reconstruction circuit comprising:

an inductor current averaging circuit, coupled to the current sense circuit, for averaging a top value and a bottom value of the second mirror inductor current to generate a mean current of the inductor current;
a first conversion resistor, coupled between the inductor current averaging circuit and the ground end, for converting the mean current into a mean voltage;
a first amplifier, coupled to the inductor current averaging circuit and the first conversion resistor, for amplifying a difference between the mean voltage and a first amplification result to generate the first amplification result;
an inverter, coupled to the gate end of the switch transistor, for inverting the second switch signal to generate an inverted switch signal;
a multiplexer, coupled to the first amplifier and the inverter, for selecting the first amplification result or a ground voltage according to the inverted switch signal to generate a selection result;
a lowpass filter, coupled to the multiplexer, for performing lowpass-filtering on the selection result to generate a filtering result;
a second conversion resistor, coupled between a conversion node and the ground end, for generating a node voltage at the conversion node;
a second amplifier, comprising a positive input end coupled to the lowpass filter, a negative input end coupled to the conversion node, and an amplification output end, for amplifying a difference between the filtering result and the node voltage to generate a second amplification result;
a conversion transistor, comprising a gate end coupled to the amplification output end of the second amplifier, a source end coupled to the conversion node, and a drain end, for determining whether the drain end is electrically connected to the conversion node according to the second amplification result to generate a reconstructed load current; and
a current mirror, coupled to the drain end of the conversion transistor, for duplicating the reconstructed load current as a mean load current.

3. The boost converter of claim 2 further comprising a second resistor, comprising one end between the load current reconstruction circuit and the third comparator, and the other end coupled to the ground end, for converting the mean load current into the second reference voltage.

4. The boost converter of claim 2, wherein the threshold voltage is a constant.

5. The boost converter of claim 2, wherein the second mirror inductor current is equal to the first mirror inductor current.

6. The boost converter of claim 1 further comprising a threshold adjustment circuit, coupled to the current sense circuit, the slope compensation circuit, the third comparator and the gate end of the switch transistor, for generating a mean load current according to a duty cycle of the second switch signal, and adaptively generating the threshold voltage according to the mean load current, the second mirror inductor current and the second slope compensation current.

7. The boost converter of claim 6, wherein the third comparator is coupled to the PWM compensation circuit and the first comparator to receive the compensation result as the second reference voltage.

8. The boost converter of claim 6, wherein the second mirror inductor current is an alternating current (AC) component of the first mirror inductor current.

9. The boost converter of claim 6, wherein the second slope compensation current is an AC component of the first slope compensation current.

10. The boost converter of claim 1, wherein the modulation control circuit generates the first switch signal according to the PWM signal and the oscillating signal when the PWM trigger signal is enabled.

11. The boost converter of claim 1 further comprising a switch-signal amplifier, coupled between the modulation control circuit and the gate end of the switch transistor, for amplifying the first switch signal to generate the second switch signal.

12. The boost converter of claim 1, wherein the feedback module comprises:
   a third resistor, comprising one end coupled between the output module and the output end, and the other end coupled to the error amplifier; and
   a fourth resistor, comprising one end coupled to the third resistor and the error amplifier, and the other end coupled to the ground end.

13. The boost converter of claim 1 further comprising:
   an input inductor, coupled between the input end and the first inductor; and
   an input capacitor, comprising one end coupled between the input inductor and the first inductor, and the other end coupled to the ground end.

14. The boost converter of claim 1 further comprising a voltage reduction circuit, coupled to the second comparator, for generating the division voltage at a level slightly lower than the first reference voltage and sending the division voltage to the second comparator.

* * * * *